United States Patent [19]
Bokern

[11] 3,967,133
[45] June 29, 1976

[54] POWER SUPPLY MEANS
[76] Inventor: James F. Bokern, 828 Mason Wood Drive, St. Louis, Mo. 63141
[22] Filed: Feb. 14, 1974
[21] Appl. No.: 442,674

[52] U.S. Cl. ............................ 307/10 R; 320/2; 320/48; 324/29.5; 340/249
[51] Int. Cl.² ........................................ H02J 1/00
[58] Field of Search .......... 307/15, 10 R; 323/22 T; 320/2, 48; 324/29.5; 340/249

[56] References Cited
UNITED STATES PATENTS

| | | | |
|---|---|---|---|
| 1,835,121 | 12/1931 | Rentschler | 307/15 |
| 2,659,042 | 11/1953 | Anderson et al. | 320/2 |
| 2,883,497 | 4/1959 | Crep | 338/199 X |
| 3,281,637 | 10/1966 | Hultquist | 320/2 |
| 3,309,598 | 3/1967 | Montgomery et al. | 320/2 |
| 3,321,754 | 5/1967 | Grimm et al. | 320/48 |
| 3,333,151 | 7/1967 | Cannalte | 323/22 T X |
| 3,358,151 | 12/1967 | Haase | 307/15 |
| 3,383,580 | 5/1968 | Wallace, Jr. | 323/22 T |
| 3,421,066 | 1/1969 | Flynn et al. | 320/48 X |
| 3,431,464 | 3/1969 | Brischnik | 323/22 T X |
| 3,453,518 | 7/1969 | Rose et al. | 320/5 |
| 3,475,061 | 10/1969 | Steinkamp et al. | 320/48 X |
| 3,518,524 | 6/1970 | Roszyk | 320/2 |

*Primary Examiner*—William M. Shoop
*Attorney, Agent, or Firm*—Charles B. Haverstock

[57] ABSTRACT

A power source particularly for use in remote locations which can be operated off of conventional sources of power such as off a battery source, said power source including means for distinguishing between different voltages and including means to indicate when power has been reduced from the power source or battery below a safe level for taking additional power therefrom. The device also includes means for preventing a polarity reversal from causing damage and it includes adapter means by which the subject power source can be plugged into a conventional receptacle such as into a cigarette lighter receptacle on the dashboard of an automobile or similar device. The subject device is particularly suitable for use by campers, emergency crews, and others who need power at remote locations and from a conventional source of power such as from a vehicle battery.

14 Claims, 6 Drawing Figures

POWER SUPPLY MEANS

The need for portable sources of power including especially portable sources that are used to energize small electrical and electronic devices such as radios, lamps, small appliances, and other like devices has long been recognized and many such sources are known and available. One of the problems of the known sources, however, is that they are not rechargeable, they are not portable, they do not provide a selection of different voltages, they do not give advanced warning of the loss of battery charge, and usually a spare battery or other source must be provided to assure the continued availability of power. These and other shortcomings of the prior art are overcome by the present device which teaches the construction and use of a relatively simple compact and portable device which makes power available at different desired voltages even at remote locations such as at campsites, and it does so by taking power from a source such as a rechargeable battery which source can be recharged by means which are usually readily available and do not require any special equipment. The present device may also include means which obviate the possibility of a polarity reversal or misconnection.

It is therefore a principal object of the present invention to provide means to make available a selection of different voltages at a remote location using a conventional source of power such as a battery source.

Another object is to provide a relatively compact plug-in type power unit for use in making power available at different selected voltages and at a location remote from more conventional power sources.

Another object is to provide means to safely take power from a battery or other like source at selected potentials and without endangering or damaging the battery.

Another object is to provide a relatively compact, inexpensive, yet versatile means to make power at different voltage levels available even at remote locations.

Another object is to provide a relatively safe easy to use power source for campers, emergency crews, boat crews and others who need a convenient and portable source of power including at locations where more conventional power sources are unavailable.

Another object is to provide a power source which preferably uses solid state components to the extent possible for convenience and reliability.

Another object is to provide means by which power from a battery source such as from an automobile type storage battery is made available at different common voltages and which includes means for indicating when the battery is drained to a level where it should be recharged to prevent it from being excessively drained.

Another object is to provide means to disconnect a load from a battery source when the charge on the battery as indicated by a decrease in battery potential has dropped below a predetermined potential.

Another object is to provide a D.C. power source which includes means to control the polarity of the output therefrom.

These and other objects and advantages of the present invention will become apparent after considering the following detailed specification which covers preferred embodiments thereof in connection with the accompanying drawings wherein.

Figure 1:
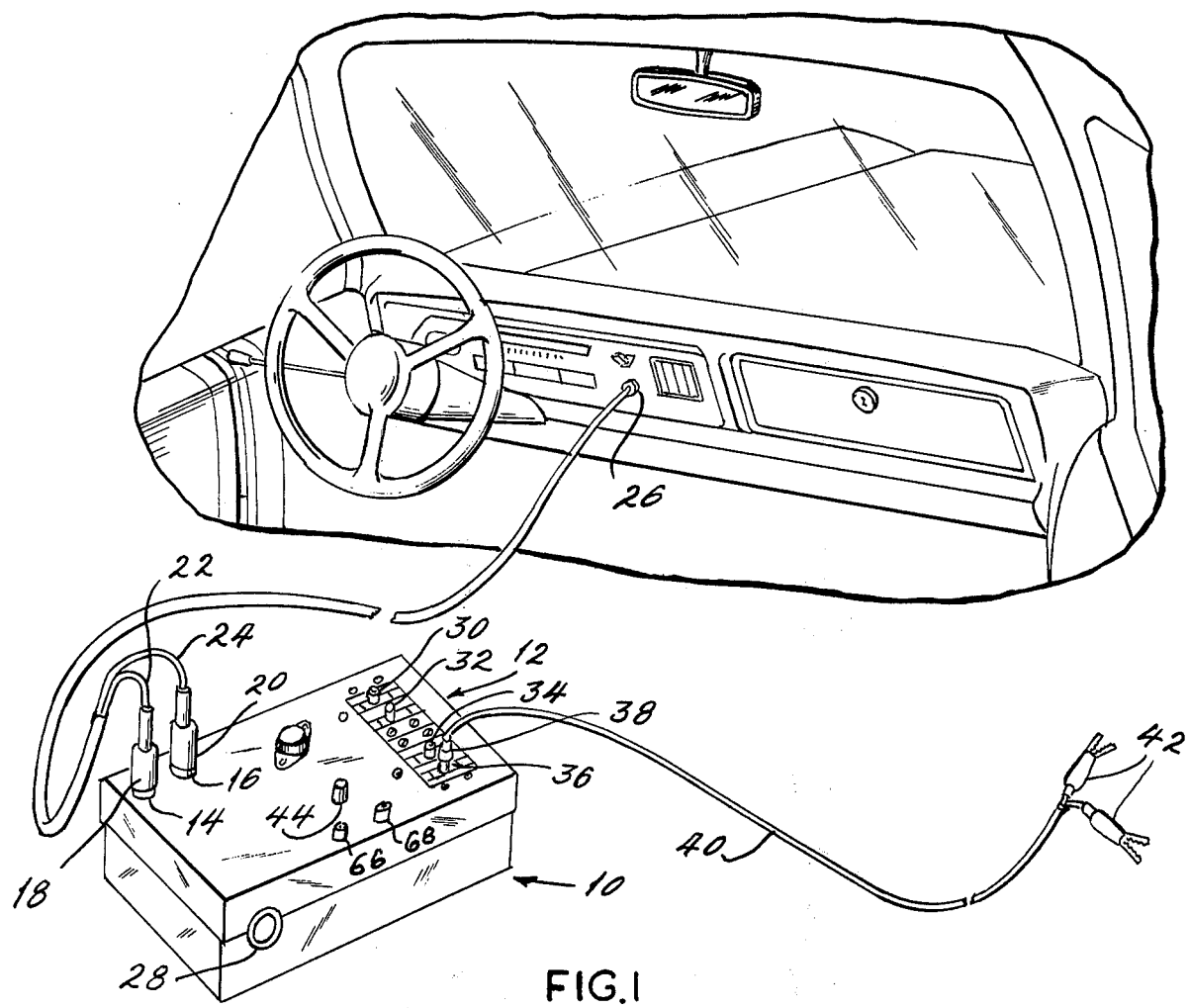
FIG. 1 is a perspective view showing one embodiment of the subject power source being supplied through a cigarette lighter receptacle located on the dashboard of an automobile.

Referring to the drawings more particularly by reference numbers, number 10 refers to a device for supplying power at different potentials from a conventional D.C. power source such as from a storage battery in an automobile using the cigarette lighter receptacle on the automobile dashboard to provide the means for connecting the device to the storage battery. As will be shown, the subject means can also be used by connecting it directly to the terminals of the battery in cases where the battery itself is portable or where it is used apart from the automobile or where the battery is in another location such as in a motor boat or on another device or vehicle. The subject device includes a housing 12 which is shown having two female electrical receptacles 14 and 16 which receive male receptacles 18 and 20. The male receptacles 18 and 20 are connected to leads 22 and 24 which have their opposite ends connected to terminals on another male receptacle 26 which mates with a female receptacle such as a cigarette lighter receptacle or the like on the dashboard of an automobile. The device 10 also has its own female outlet receptacle 28 shown mounted in one side thereof, and the receptacle 28 can be used to receive another male receptacle similar to the receptacle 26 to provide power at the same potential as the battery potential. In addition, the housing 12 has other female output receptacles shown as the receptacles 30, 32, 34 and 36 which, as will be explained, make available output voltages at different potentials which can be used for different purposes. For example, the receptacle 30 is the nine volt receptacle and makes available a nine volt D.C. output, the receptacle 32 is the 6.3 volt output receptacle, the receptacle 34 is the 4.5 volt output receptacle, and the receptacle 36 is the 3.5 volt output receptacle. These voltages in addition to the full battery voltage available at the receptacle 28 are the more common D.C. voltages needed to operate many types of devices such as radios, tape recorders, tape players, lights of various types, portable pumps, emergency devices, radio transceivers, fishfinders, electric shavers, and so forth to mention a few. Any one or more of these voltages are made available simply by plugging a male receptacle such as male receptacle 38 into the desired female receptacle 30–36. The male receptacle 38 is connected by a suitable lead, such as two wire lead 40, to an output receptacle which may take different forms such as being a plug-in type receptacle such as the receptacles 18 and 20, it may have alligator clips, such as the alligator clips 42, and it may have other forms including having male and female snap type connectors such as are commonly used on transistor radios and the like. One of the connections to the outlet means will usually provide the ground connection to the device to be powered and this connection will also be grounded to the housing 12 as shown.

The device 10 may have a firefly type light assembly 44 mounted thereon at a suitable location as shown, and the light assembly 44 is used to indicate when the battery source that is supplying power is suitably charged, and when it has been drained below a certain established level and needs to be recharged. Other circuits and circuit elements are also included in the device 10 and will be described more in detail in connection with the circuit of FIG. 2.

Figure 2:
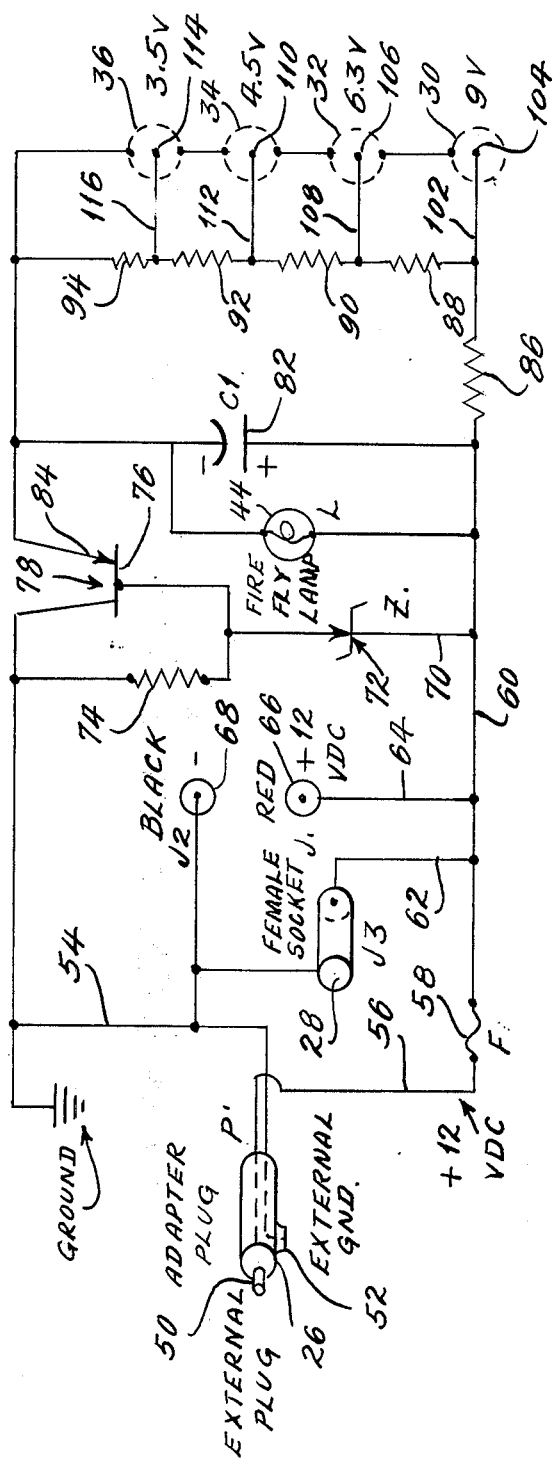
FIG. 2 is a schematic circuit diagram for the device shown in FIG. 1.

The circuit of FIG. 2 is constructed to be used by inserting the male plug 26 into the female cigarette lighter receptacle on the dashboard of an automobile. The receptacle 26 has a center conductor terminal 50 which is the hot input terminal of the device, and an outer terminal 52 which is the ground terminal and is grounded to the housing 12 through lead 54. The terminal 50 is connected by another lead 56 to one side of a fuse 58, and the other side of the fuse is connected to a main bus or terminal 60. The bus 60 is connected to one side of a plurality of parallel circuits the first of which includes lead 62 which is connected to the hot terminal of the female receptacle 28 located in the side of the chassis 12. The outer conductor of the receptacle 28 is grounded. The receptacle 28 can be used in exactly the same manner but as an extension of the cigarette receptacle on the automobile dashboard, the only difference being that the receptacle 28 can be used to provide battery voltage at a location remote from the vehicle.

Another parallel circuit includes lead 64 which is connected to a plug-in receptacle 66 also shown located on the chassis 12. The receptacle 66 is constructed to receive a conventional type of male plug. A grounded receptacle 68 is also provided and is used in conjunction with the receptacle 66 to provide power at full battery voltage which is shown in the drawing as being 12 volts.

Another lead 70 is connected at one end to the bus 60 and at the other end to one side of a zener diode 72. The opposite side of the zener diode 72 is connected to one side of a bias resistor 74 and also to base element 76 of transistor 78. As long as the source or battery voltage continues to be above some predetermined voltage level as determined by the zener diode 72, the zener diode will continue to conduct and in so doing will maintain a predetermined voltage on the base 76 of the transistor 78. This in turn maintains the transistor 78 in a conducting condition which is a necessary condition for the circuit to supply power to an auxiliary load. The voltage that is applied to the transistor base 76 is controlled by the size of the bias resistor 74, and this is selected to be some predetermined voltage below which the battery voltage should not be permitted to fall. If the battery voltage should fall below this predetermined voltage, it means that the battery should be recharged before more power is taken from it. When this happens the transistor 78 will cease conducting and it will no longer be possible to take power at least from certain portions of the circuit as will be described. In the case of a 12 volt storage battery such as commonly used in automobiles, motorboats, trucks and other devices a safe lower battery voltage level of about 11.8 volts is a good selection, and this can be controlled by selection of the circuit elements including the zener diode 72 and the resistor 74.

Figure 4:
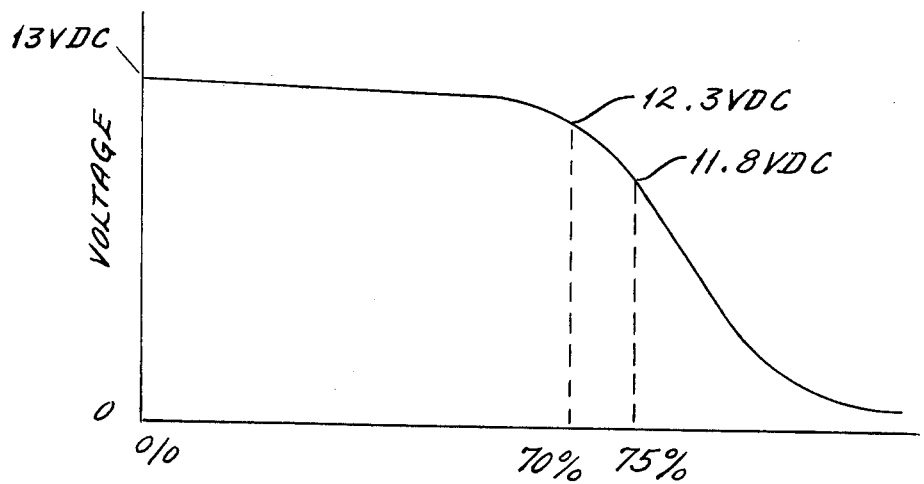
FIG. 4 is a graph of battery voltage plotted as a function of the percentage discharge of the battery.

FIG. 4 shows a graph of the voltage between the terminals of a typical 12 volt storage battery as a function of charge. When the battery is fully charged the voltage between the battery terminals will be about 13 volts D.C., and as power is taken from the battery the terminal voltage will decrease as shown until it reaches the knee of the curve where the battery voltage has fallen to 12.3 volts and the percentage remaining charge has fallen so that approximately 70% has been dissipated. Thereafter, the battery charge diminishes more rapidly until at approximately 11.8 volts D.C. 75% of the battery charge has been dissipated. If the zener diode 72 is selected to change from a conducting to a non-conducting condition at 11.8 volts then when the terminal potential of the battery falls below 11.8 volts the diode essentially stops conducting or goes to a very low conducting condition in the microampere range, and at this point the indicator light assembly 44 ceases to conduct and goes out due to the transistor 78 also becoming non-conducting. A capacitor 82 is connected in parallel across the firefly lamp assembly 44 to stabilize its operation and to stabilize the voltage applied to the emitter electrode 84 of the transistor 78. The transistor 78 ceases to conduct when the diode 72 ceases to conduct because when this occurs there is no voltage applied to the base of the transistor 78 and the transistor is effectively reduced to its non-conducting condition. When this occurs there is no longer a return path to ground for the circuits on the opposite side of the transistor from the battery. The deenergizing of the light 44 is an indication to the user that the battery needs to be recharged before more power can be taken from it.

It is important that the battery voltage at which the condition described occurs be selected to be large enough so that the battery, if it is in an automobile or other similar device, will still have sufficient charge to be able to be used to restart the engine so that the battery can be recharged. At 11.8 volts this is usually still possible. If the battery is not in a vehicle then it can be recharged by using other battery charger means or the like. It should be noted however, that the receptacles 28 and 66 are not dependent upon the operation of the diode 72 and the transistor 78 as just described, and therefore are not similarly protected, although they could be made to be so, if desired.

Another circuit is connected across the power supply circuit on the opposite side of the transistor 78 from the input thereto. This circuit is a voltage divider circuit and is formed by a plurality of series connected resistors 86, 88, 90, 92 and 94 connected as shown. The plurality of output receptacles shown as female receptacles 30, 32, 34 and 36 are connected to various corresponding terminals of the voltage divider circuit to provide output voltages at desired voltage levels. For example, the receptacle 30 is connected between the resistors 86 and 88 near the hot side of the battery by lead 102 and when this receptacle is plugged by an output lead such as by a male receptacle on the lead 40 in FIG. 1, nine volts are available at the hot terminal 104 of the receptacle 30. The outer terminal of the receptacle 30 is connected to the outer terminals of the other receptacles 32, 34 and 36 and all of these are grounded through a circuit which includes the emitter and collector electrodes of the transistor 78. In like manner, the hot terminal 106 of the receptacle 32 is connected by lead 108 to the junction between the series connected resistors 88 and 90 and provides a 6.3 volt output. The hot terminal 110 of the receptacle 34 is connected between the series connected resistors 90 and 92 by lead 112 and provides a 4.5 volt output, and the hot terminal 114 of the receptacle 36 is connected by lead 116 to the junction between the resistors 92 and 94 and provides a 3.5 volt D.C. output. Other D.C. output voltages could also be provided if desired, although for most purposes, when using a 12 volt battery, output voltages of 12 volts, 9 volts, 6.3 volts, 4.5 volts and 3.5 volts will suffice. These voltages are made available by proper selection of the resistances of the resistors 86–94.

Thus when the dashboard receptacle 26 is used as the means to connect the subject device to the battery source, the firefly lamp 44 will be energized as long as the battery voltage remains above 11.8 volts due to the action of the zener diode 72 and the transistor 78. As long as this condition is maintained continuity will be established through the transistor 78 and between the opposite sides of the voltage divider circuit. Under these conditions power will be available at the various voltage levels from the various receptacles 30–36. However, when the battery voltage drops below the predetermined level under control of the zener diode as stated the transistor 78 will no longer be able to conduct and will be cut off, and there will no longer be continuity between the voltage divider circuit and ground. This condition will be indicated by extinguishing the firefly lamp 44 and by the unavailability of power from the receptacles 30–36. The user will therefore know that he needs to recharge the battery before taking more power to prevent overdraining it. The present device therefore provides a convenient multiple voltage power source which can be used to operate many different kinds of electric equipment including transistor radios, lights of various kinds and for various purposes including for campsites and emergency situations, electric shavers, to operate a fishfinder device, and for a myriad of other devices and purposes. It is also apparent that the subject circuit can be used with storage batteries of various types including the more common 6, 12 and 24 volt batteries to name a few. Furthermore, the dashboard receptacle 26 can be substituted for by jumper connections made directly to a storage battery thereby also enabling the device to be used with storage batteries that are not part of another system such as by being installed in an automobile, truck, motorboat or other vehicle. When this is done, the entire system including the battery can be made to be portable and mobile and it can be combined for use with a battery charger if desired.

Figure 3:
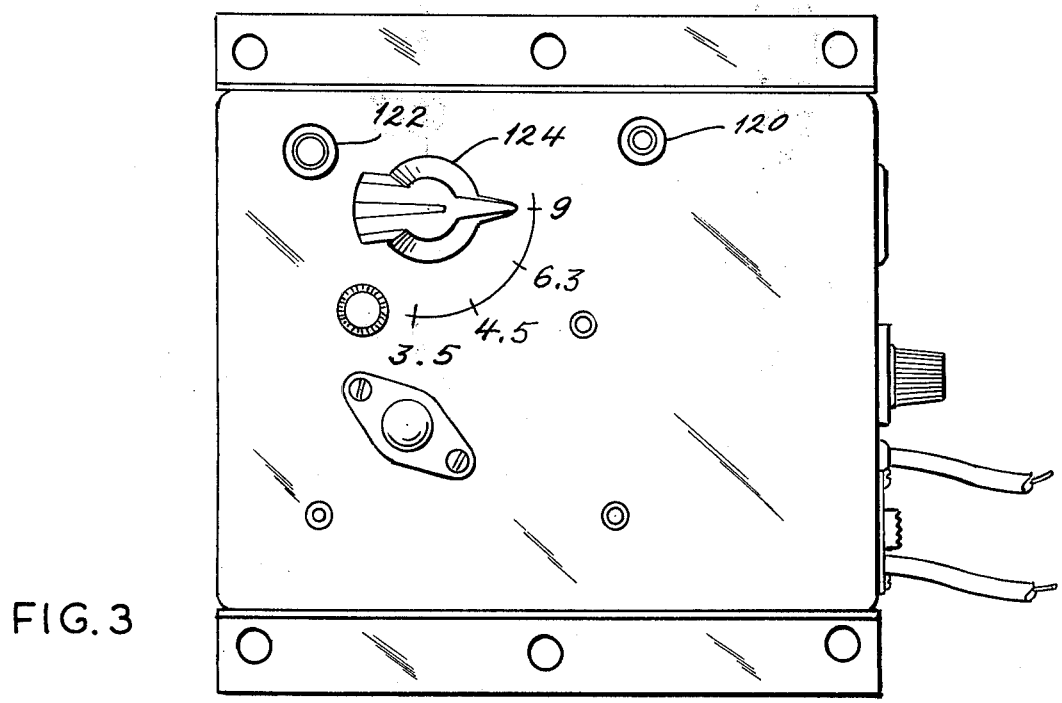
FIG. 3 is a top plan view showing another embodiment of the subject device.

FIG. 3 shows another embodiment of the subject device but wherein the receptacles 30, 32, 34 and 36 are replaced by a single pair of output receptacles 120 and 122, one of which is grounded and the other selectively connected to different voltages by the setting of a multiple position switch 124. In this case, the receptacle 122 is the grond side receptacle and the receptacle 120 is selectively connected to the different locations in a voltage divider circuit such as the voltage divider circuit shown in FIG. 2. Depending upon the setting of the switch 124 therefore determines the voltage availability at the terminals 120 and 122. One of the main differences between the device of FIGS. 1 and 2 and the device of FIG. 3 is that with the FIG. 3 device only one output voltage is available at any one time under control of setting of the switch 124 while with the construction shown in FIGS. 1 and 2, two or more different output voltages can be used simultaneously as desired. This is because it is possible, for example, to plug a lamp into the 6.3 voltage output receptacle 32 while simultaneously plugging a transistor radio into the 9 volt receptacle 30. Other combinations are also possible. Except for these differences the constructions of FIG. 1 and 3 are similar and operate similarly. It is also possible with either construction to use multiple output connections from the same receptacle and means for accomplishing this are well known and available commercially. Furthermore, both positive and negative output potentials can be taken by the use of appropriate output cables and cable connections. This is important inasmuch as some devices such as some current transistor devices require negative voltages to operate. Cables that make such a polarity reversal possible are available commercially.

It is also contemplated to substitute for the zener diode 72, the firefly lamp 44 and the transistor 78, a voltmeter or microammeter circuit which provides a visual indication as to the actual battery voltage. If this substitution is made, the operator must periodically check the battery voltage to make sure that it has not been excessively reduced.

Figures 5, 6:
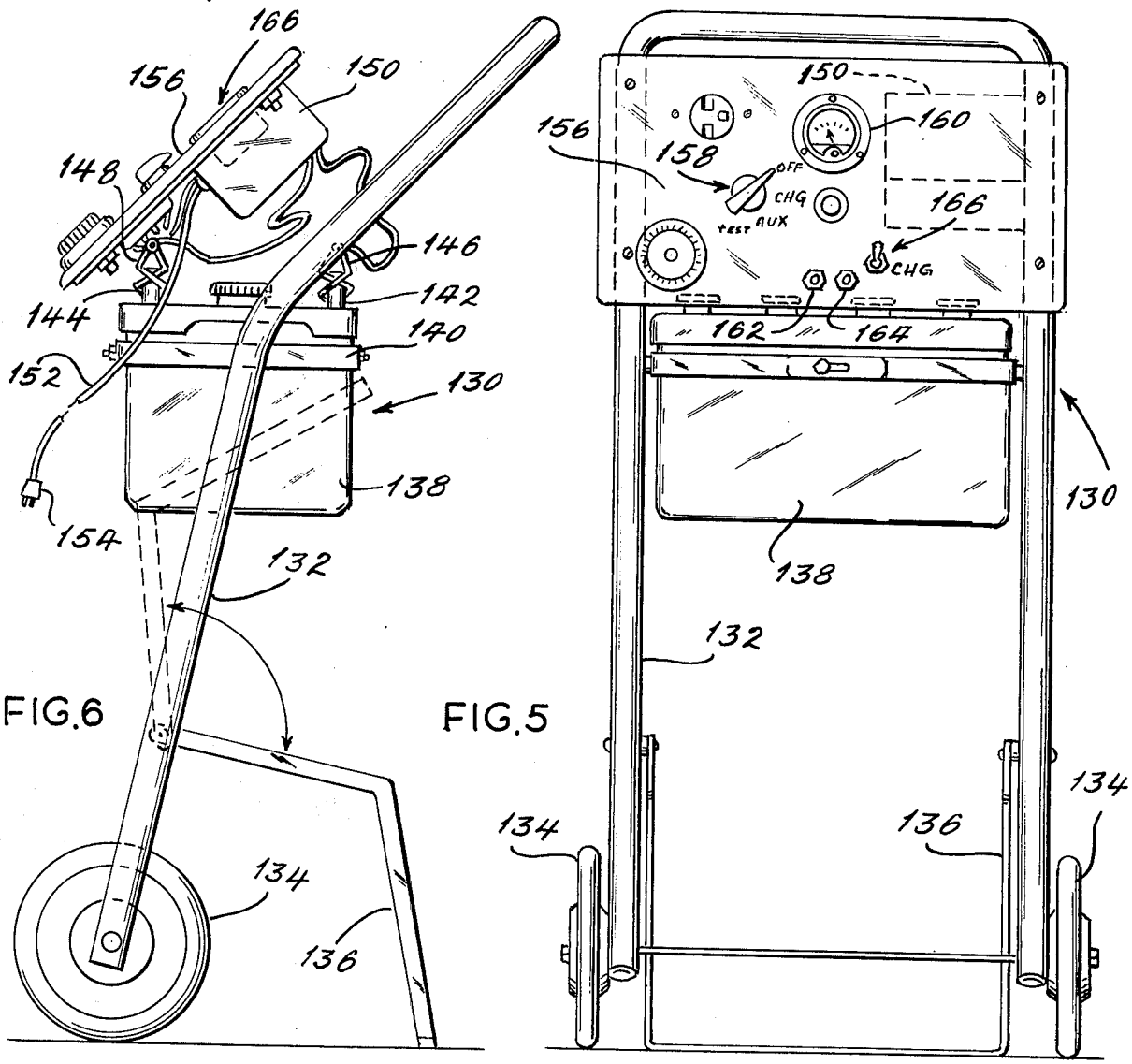
FIG. 5 shows another embodiment of the subject device mounted together with a storage battery and battery charging means on means which make them readily portable; and, FIG. 6 is a side view of the modified device of FIG. 5.

FIGS. 5 and 6 show another embodiment 130 which is mounted on a frame structure 132. The frame 132 is supported for movement on wheels 134 and includes a pivotal support portion 136 which is used to maintain it in an upstanding position. A storage battery 138 is mounted on the frame 132 in a bracket 140 and has its output terminals 142 and 144 connected by clips 146 and 148 to circuit means similar to those described above, and also to a battery charger device 150 which may be of conventional construction. The battery charger 150 has a power cord 152 and plug 154 which can be plugged into an A.C. outlet such as into a 110 volt outlet when the battery is to be recharged.

The portable device 130 has a control panel 156 which has a multiposition switch 158 mounted thereon. The switch 158 is shown having four different setting positions including (1) an OFF setting position when the device is inoperative; (2) a CHG (or charge) setting position which is used when it is desired to recharge the battery 138 and when the plug 154 is inserted in a suitable A.C. acceptable; (3) an AUX (or auxiliary) setting position which is used when power is being supplied to some load such as described above; and (4) a TEST position which is used to indicate the battery terminal voltage on meter 160. The control panel also has two or more outlet receptacles 162 and 164 which are used to provide the power to a load. These receptacles can be substituted for by receptacles similar to the receptacles 30–36 in FIGS. 1 and 2. Another switch 166 may also optionally be provided on the panel 156. The switch 166 is labeled CHG and must be moved to its charge setting position to complete the circuit necessary to charge the battery.

The battery 138 can also be recharged by disconnecting the battery charger device 150 from the battery and connecting the battery to an engine such as an automobile engine. This can be done in the usual way using jumper connections or by removing the battery from the bracket 140 and installing it in the vehicle or other engine driven device.

Thus there has been shown and described novel means for making power readily available at different voltages especially at remote locations, which means fulfill all of the objects and advantages sought therefor.

It will be apparent however, that many changes, modifications, variations, and other uses and applications of the subject means will become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. Means for providing power at different preselected voltages from a D. C. source such as from a storage battery of the type used with internal combustion engines comprising a battery source having output terminals at which the battery voltage is available, a housing having first, second and third female receptacle connection means thereon and circuit means in the housing, means including said female connection means connecting the circuit means to the battery output terminals, said circuit means including a current controlled device having emitter and collector elements for connection across the battery terminals, a voltage divider circuit formed by a plurality of series connected resistor elements in series with the current controlled device across the battery terminals, output connection means connected to selected ones of the connection locations between pairs of adjacent resistors in the voltage divider circuit, said output connection means including the second female receptacle means on the housing and means for making connection between selected ones of said second receptacle means and the connection locations depending upon the desired voltage, and other means operatively connected in the circuit means including means operative in response to the battery voltage falling below a predetermined voltage to simultaneously discontinue the supply of power from the battery to the voltage divider circuit and to a load connected across a portion thereof, said last named means also including means which are deenergized when the voltage falls below the predetermined level to indicate the occurrence of this condition, said indicating means being mounted on said housing means, said third female receptacle means including means for making another output voltage available.

2. The means defined in claim 1 wherein said means for making connection between selected ones of said output connection locations include a multiposition switch having a different switch setting position and an associated connection to the connection locations between said selected pairs of adjacent resistors in the voltage divider circuit.

3. The means defined in claim 1 including means to make the voltage divider circuit ineffective whenever the battery voltage falls below a predetermined voltage, said last name means including a zener diode, circuit means connecting said zener diode across the battery terminals, and means under control of the conducting condition of the zener diode to control circuit continuity between the voltage divider circuit and one of the battery terminals.

4. The means defined in claim 1 including plug-in receptacle means connected between the voltage divider circuit and the battery terminals.

5. The means defined in claim 3 including means under control of the conducting condition of the zener diode to indicate when the battery terminal voltage is above a predetermined voltage, said indicator means being connected across the voltage divider circuit.

6. The means defined in claim 1 including a housing in which said voltage divider circuit is located, and other means on said housing including an electrical receptacle having first and second electrical connections operatively connected respectively to the battery terminals.

7. Means for providing power at selected voltage levels from a D. C. source such as from a battery source comprising a housing having circuit connection means thereon including first, second and third female receptacle means on the housing, an electric circuit positioned in the housing and having input means including said first female receptacle means operatively connected to the terminals of the D. C. source, means responsive to the terminal voltage of the source including means capable of going from a conducting to a non-conducting condition when the voltage of the source falls below a predetermined voltage, a voltage divider circuit and a current operated element operatively connected in series across the D. C. source, said voltage divider circuit including a plurality of series connected resistor elements with connector locations between selected adjacent resistor elements therein, said second female receptacle means on the housing being operatively connected to selected ones of the connector locations in the voltage divider circuit to provide access to different selectable voltages, means connected across a portion of the voltage divider circuit to stabilize the voltage thereacross, means energizeable by the source to indicate when the voltage of said source is above said predetermined voltage, and means including said means responsive to the terminal voltage of said source to make said second female receptacle means ineffective whenever the voltage of the source falls below said predetermined voltage, said last named means including means to simultaneously deenergize the indicator means, said third female receptacle means on the housing being connected to the electric circuit to provide a distinct output voltage thereat.

8. The means for providing power defined in claim 7 wherein said means responsive to the source voltage include a zener diode connected to control the conducting condition of the current operated device.

9. The means for providing power defined in claim 7 including a multiposition switch having a plurality of terminals connected to respective ones of connector locations in the voltage divider circuit, said switch also having another connection operatively connected to one side of the D.C. source, the setting of said switch determining the voltage between the output receptacles.

10. The means for providing power defined in claim 7 including means to indicate when the D.C. source voltage falls below said predetermined voltage, said last name means including an indicator light and means connecting the indicator light across a portion of the voltage divider circuit.

11. The means for providing power defined in claim 7 including means to indicate when the D.C. source voltage falls below said predetermined voltage, said last name means including a voltage indicating meter and means connecting said voltage indicating means across a portion of the voltage divider circuit.

12. Portable means for providing power to a load at selected voltage levels from a D. C. source such as from a battery comprising a battery having a pair of output terminals, a housing having first, second and third female receptacle means thereon, an electric network positioned in the housing and having input means including the first female receptacle means operatively connected to the battery output terminals, said electric network including a voltage divider circuit formed by a plurality of series connected resistors, means connecting the voltage divider circuit across the D. C. source, connection means including the second female receptacle means connected between selected ones of the resistors in the voltage divider circuit to provide a selection of different output voltages, means including a load cooperatively engageable with selected ones of said second female receptacle means depending on the voltage requirements of the load, means to indicate when the voltage level of said D. C. source is above a predetermined voltage, said third receptacle means on the housing including means adapted to be connected to a source of charging potential, means forming portable support means for the battery and housing, and multiposition switch means mounted on the housing and movable between a first setting position which is the off position, a second setting position which establishes circuit continuity to charge the battery, a third setting position which establishes circuit continuity for checking the charge remaining on the battery, means to deenergize the indicator means and to prevent the further supply of energy to the load when the voltage of the source falls below said predetermined voltage, and a fourth setting position for use when supplying power to the load.

13. The portable means for providing power as set forth in claim 12 including meter means to indicate the battery voltage when the switch means are in the third setting position.

14. The portable means for providing power as set forth in claim 12 including means to make the voltage divider circuit ineffective whenever the battery voltage falls below a predetermined voltage, said last name means including a zener diode and circuit means connecting said zener diode across the battery terminals, and means under control of the conducting condition of the zener diode to control circuit continuity between the voltage divider circuit and the battery terminals.

* * * * *